United States Patent [19]
Kuras

[11] Patent Number: 5,996,343
[45] Date of Patent: Dec. 7, 1999

[54] OVERSPEED CONTROL SYSTEM FOR A HYDRO-MECHANICAL DRIVE SYSTEM

[75] Inventor: Brian D. Kuras, East Peoria, Ill.

[73] Assignee: Caterpillar Inc., Peoria, Ill.

[21] Appl. No.: 09/190,425

[22] Filed: Nov. 12, 1998

[51] Int. Cl.$^6$ ................................................... F16D 31/02
[52] U.S. Cl. ................................. 60/448; 60/449; 60/491
[58] Field of Search ............................ 60/445, 448, 449, 60/490, 491

[56] References Cited

U.S. PATENT DOCUMENTS

| | | | |
|---|---|---|---|
| 4,344,399 | 8/1982 | Matsummura et al. | 123/339 |
| 4,453,378 | 6/1984 | Zagranski et al. | 60/39.02 |
| 4,561,055 | 12/1985 | McKee | 364/424.1 |
| 4,748,565 | 5/1988 | Toya | 364/431.05 |
| 4,956,779 | 9/1990 | Rutherford | 364/426.05 |
| 5,050,084 | 9/1991 | Nakaniwa | 364/431.07 |
| 5,189,620 | 2/1993 | Parsons et al. | 364/431.02 |
| 5,224,045 | 6/1993 | Stasell | 364/431.07 |
| 5,435,131 | 7/1995 | Hausman et al. | 60/327 |
| 5,553,453 | 9/1896 | Coutant et al. | 60/448 X |
| 5,560,203 | 10/1996 | Pollman | 60/448 X |
| 5,561,979 | 10/1996 | Coutant et al. | 60/448 |

*Primary Examiner*—Hoang Nguyen
*Attorney, Agent, or Firm*—David M. Masterson

[57] ABSTRACT

In one aspect of the present invention, an apparatus for controlling the negative load of an engine is disclosed. The engine is drivingly connected to a hydro-mechanical drive system that includes a variable displacement pump and motor. An engine speed sensor senses the rotational speed of the engine and produces an actual engine speed signal indicative of the rotational engine speed. A travel speed sensor senses the travel speed of the machine and produces an actual travel speed signal indicative of the machine travel speed. An overspeed controller compares the actual engine speed signal to a proportional and integral threshold, produces a proportional and integral error signal indicative of the difference between the actual engine speed signal magnitude and the corresponding thresholds, calculates a proportional and integral control signal from the corresponding errors, combines the proportional and integral control signals and responsively produces a command signal. A displacement controller receives the command signal and responsively controls one of the variable pump and motor to regulate the negative engine load to optimize the retarding power of the engine without overspeeding the engine or drivetrain.

16 Claims, 5 Drawing Sheets

5,996,343

OVERSPEED CONTROL SYSTEM FOR A HYDRO-MECHANICAL DRIVE SYSTEM

TECHNICAL FIELD

This invention relates generally to a control system for a hydro-mechanical drive system and, more particularly, to a control system for a hydro-mechanical drive system to prevent the drive system from overspeeding.

BACKGROUND ART

Many machines, particularly earth working machines, use a hydrostatic drive system to drive the traction wheels or tracks of the machine. The machine speed can be regulated by controlling the displacements of the two hydraulic elements of the hydrostatic drive system.

One common problem with earth moving machines which use hydrostatic or hydro-mechanical transmissions is that the machine can be operated in an engine overspeed condition. An overspeed condition occurs when the machine decelerates quickly or the machine travels down a slope in which there is a reversal of torque in the powertrain such that the engine and drivetrain provide a resistive load to the system. In a hydrostatic transmission, the hydraulic motor will act like a pump and the hydraulic pump will act like a motor. This can put undesirable stresses on the drivetrain and the engine. An overspeed condition can thus cause severe damage to the pump, motor and engine by exceeding the designed operating speed of the component.

One attempt at overcoming this problem is monitoring the engine speed and adjusting the displacements of the pump and motor to prevent the overspeeding condition. However, such systems sometimes react to an overspeed condition too late and thus damage certain powertrain components. Also, while these open-loop control schemes do prevent an overspeed condition, they do not directly control machine deceleration to optimize the energy dissipation provided by an engine friction curve. Such an engine friction curve is shown in FIG. 4 where Engine Torque is graphed against Engine Speed.

Some systems attempt to predict an overspeed condition by calculating the derivative or change of engine speed and react upon this calculated term. However, many times a derivative term can be a noisy parameter which is difficult to use as a feedback signal. Some systems attempt to filter the derivative calculation, but the filter may incorporate a lag which the derivative term was originally trying to remove.

The present invention is directed toward overcoming both of the problems as set forth above.

DISCLOSURE OF THE INVENTION

In one aspect of the present invention, an apparatus for controlling the engine and drivetrain from overspeeding is disclosed. The engine is drivingly connected to a hydro-mechanical drive system that includes a variable displacement pump and variable displacement motor. An engine speed sensor senses the rotational speed of the engine and produces an actual engine speed signal indicative of the rotational engine speed. A travel speed sensor senses the travel speed of the machine and produces an actual travel speed signal indicative of the machine travel speed. An overspeed controller compares the actual engine speed signal to a proportional and integral threshold, produces a proportional and integral error signal indicative of the difference between the actual engine speed signal magnitude and the corresponding thresholds, produces a proportional and integral control signal from the corresponding errors, combines the control signals and responsively produces a command signal. A displacement controller receives the command signal and responsively controls one of the variable pump and motor displacement to control the negative load imposed on the engine.

BRIEF DESCRIPTION OF THE DRAWINGS

For a better understanding of the present invention, reference may be made to the accompanying drawings in which.

BEST MODE FOR CARRYING OUT THE INVENTION

Figure 1:
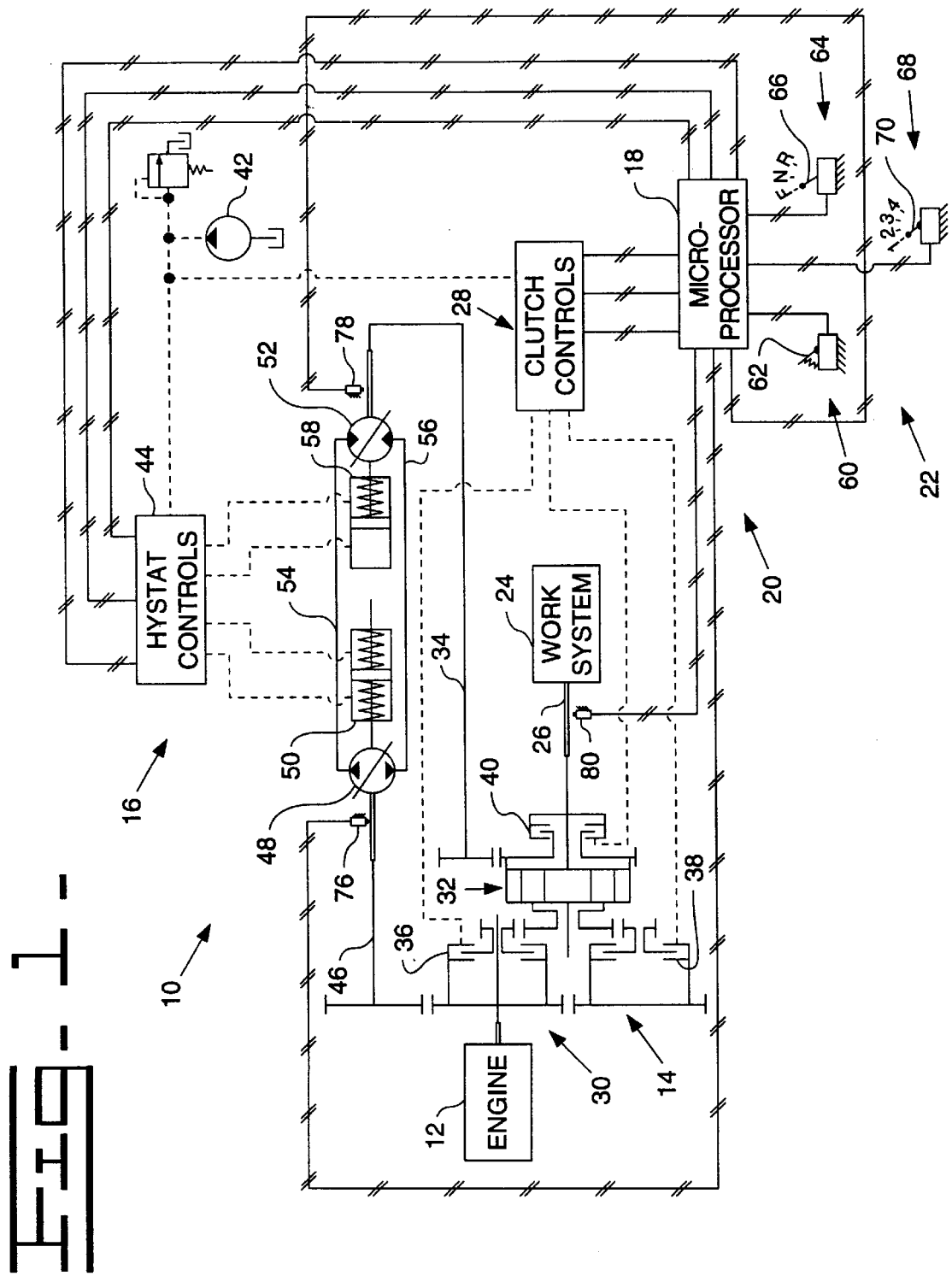
FIG. 1 illustrates a diagrammatic illustration of a hydro-mechanical, continuously variable transmission utilizing the subject invention.

A transmission system 10 is shown for use in a machine (not shown) having an engine 12. The illustrated transmission system 10 is of the continuously variable type and includes a mechanical transmission 14, a continuously variable transmission 16, a micro-processor based controller 18, a.k.a. overspeed controller, a sensing arrangement 20 and a command input arrangement 22. Although the illustrated transmission system 10 is shown to be a continuously variable transmission the invention is equally applicable to most any type of continuously variable transmission including a hydro-mechanical, hydrostatic transmission system or the like. A work system 24 is connected to the transmission 10 by a drive shaft 26.

The mechanical transmission 14 and an associated clutch control arrangement 28 are operatively connected to the engine 12 through a gear arrangement 30. The mechanical transmission 14 includes a summing planetary arrangement 32 operatively connected to both the engine 12 through the gear arrangement 30 and to the hydrostatic transmission 16 through a motor output shaft 34. The output of the summing planetary arrangement 32 is connected to the drive shaft 26. The mechanical transmission 14 also includes directional high speed clutches 36, 38 and a low speed clutch 40. The clutch control arrangement 28 is connected to a source of pressurized pilot fluid, such as a pilot pump 42 and the controller 18 and is operative in response to electrical signals from the controller 18 to control engagement and disengagement of the respective speed clutches 36, 38 and 40.

The hydrostatic transmission 16 and associated hydrostatic control arrangement, a.k.a, displacement control, 44 is operatively connected to the engine 12 through a pump input drive shaft 46. The hydrostatic transmission 16 includes a variable displacement pump 48, a pump displacement actuator 50, a variable displacement motor 52 fluidly connected to the variable displacement pump 48 by conduits 54, 56, and a motor displacement actuator 58. The hydrostatic control arrangement 44 is connected to the pilot pump 42 and the controller 18 and is operative in response to electrical signals from the controller 18 to control movement of the respective pump and motor displacement actuators 50, 58.

The command input arrangement 22 includes a speed input mechanism 60 having a speed pedal 62 moveable from a zero speed position to a maximum speed position for producing a desired machine speed signal, a direction control mechanism 64 having a direction control lever 66 selectively moveable from a neutral position to a forward or a reverse position, and a speed range control mechanism 68 having a speed lever 70 selectively moveable between a first position and a fourth position. The engine includes RAM and ROM (not shown) that stores engine control software. In the preferred embodiment, the software includes a value for the engine governor setting which represents a desired engine speed. Based on the desired engine speed, the overspeed control associated with the present invention determines a proportional threshold and an integral threshold used for the overspeed calculation.

The sensing arrangement 20 includes an engine speed sensor 76 operative to sense the speed of the pump input shaft 46 and direct an engine speed signal representative of the rotation speed of the engine 12 to the controller 18. A transmission speed sensor 78 is operative to sense the speed of the motor output shaft 34 and direct a motor output speed signal representative of the motor output speed to the controller 18. A travel speed sensor 80 is operative to sense the speed of the output drive shaft 26 and direct a machine travel speed signal representative of the machine travel speed to the controller 18.

Figure 2:
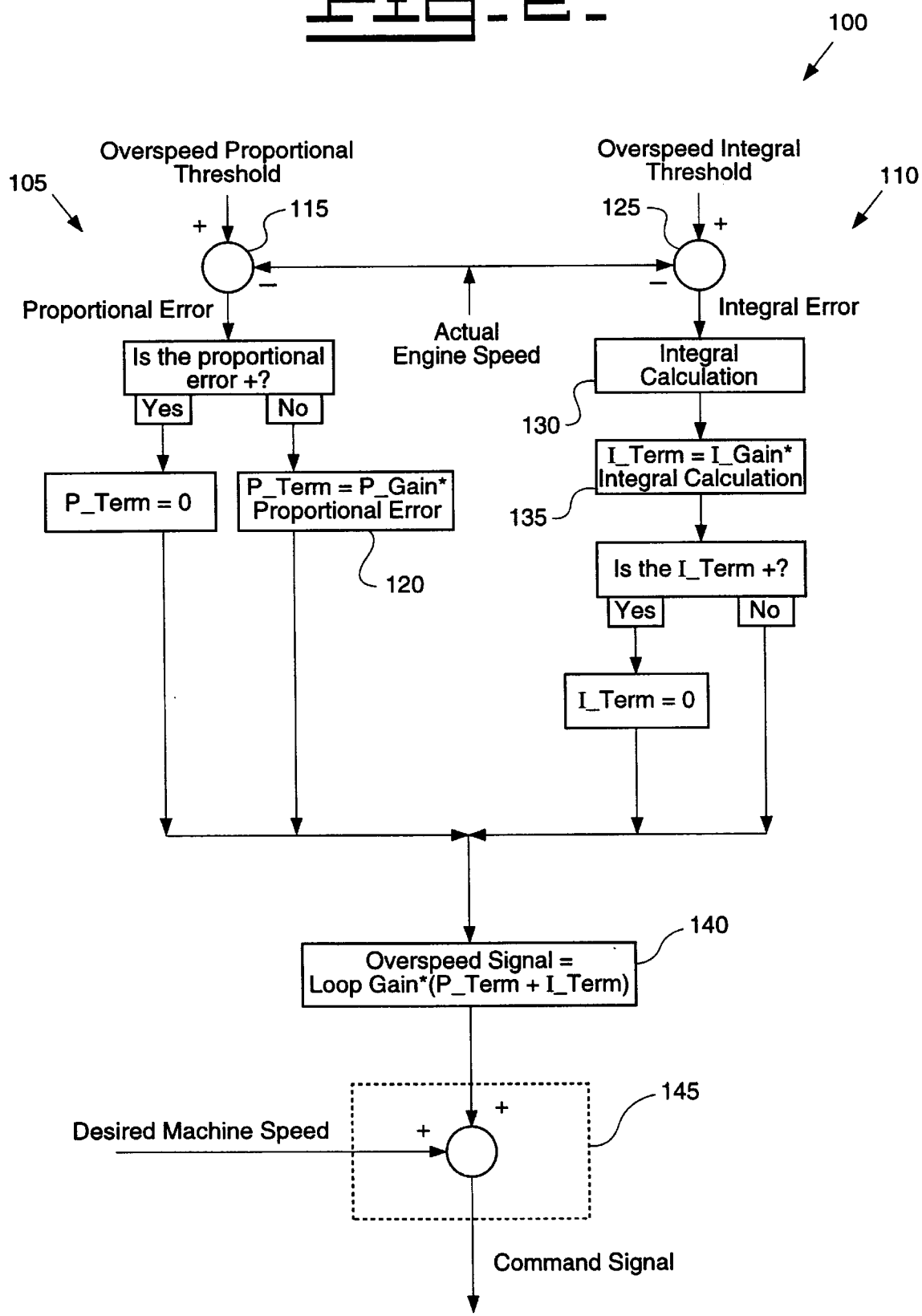
FIG. 2 illustrates an overspeed control employing a proportional plus integral feedback controller according to the present invention.

The present invention is now described with respect to FIG. 2 which shows a logical block diagram of an aspect of the present invention that relates to an engine overspeed control 100. The engine overspeed control is embodied in software that is resident in the controller 18. The engine overspeed control 100 includes a proportional feedback controller 105 and an integral feedback controller 110.

The proportional controller 105 receives a proportional threshold (which represents a predetermined engine speed, e.g. 1950 r.p.m.), compares the threshold to the actual engine speed, and produces a proportional error at block 115. The proportional error is multiplied by a proportional gain value (P_Gain) to produce a proportional control signal (P_Term) at block 120. The integral controller 110 receives an integral threshold (which represents a predetermined engine speed, e.g. 2200 r.p.m.), compares the threshold to the actual engine speed, and produces an integral error at block 125. An integral calculation is performed on the integral error at block 130 in response to integrating the integral error. The integral calculation is multiplied by an integral gain value (I_Gain) to produce an integral control signal (I_Term) at block 135.

The proportional and integral control signals are combined at block 140 and multiplied with a Loop Gain to produce an overspeed signal. Summing junction 145 combines the overspeed signal with a signal indicative of a desired machine speed to produce a command signal. The command signal is delivered to the displacement controller 44 which regulates the displacement actuators 50, 58 to control the displacement of the respective pump and motor 48, 52. Thus, the command signal controls the deceleration rate of the machine to reduce the negative load on the engine 12 to prevent the drivetrain and engine from overspeeding.

Note, the proportional gain, i.e., P_Gain, and the Loop Gain represent predetermined gain values, and the integral gain, i.e., I_Gain, is discussed below.

Figure 3:
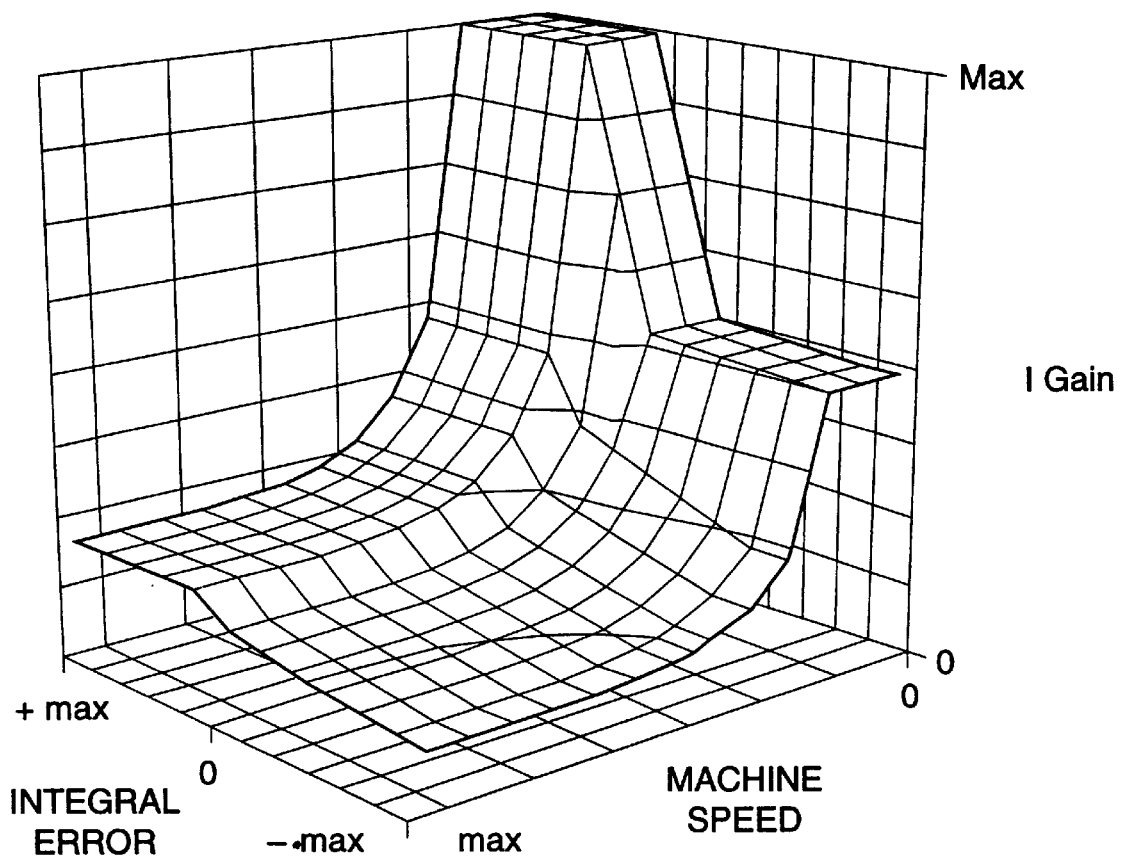
FIG. 3 illustrates a three-dimensional integral gain-scheduling table.

Advantageously, the engine overspeed control 100 of the present invention determines the integral gain value in response to two variables: machine speed and overspeed integral error. For example, the integral gain value may be a function of machine speed and overspeed integral error as shown in FIG. 3. Although the integral gain value is shown as a hyperbolic function of machine speed, the integral gain value may take a variety of forms in which relatively high integral gain values are used for a relatively slow machine travel speed and relatively low integral gains are used for relatively high machine travel speed. Also, although the integral gain value is shown as a steep slope as a function of overspeed integral error as shown in FIG. 3, the integral gain value may take a variety of forms in which relatively high integral gains are used for a non-overspeeding condition (positive integral control error), and relatively low integral gains are used for an overspeeding condition (negative integral control error). In the preferred embodiment, a three-dimensional look-up table of a type well known in the art is used to store the integral gain values. The respective coefficients for each of the proportional and integral components are determined using conventional control design methods.

Thus, while the present invention has been particularly shown and described with reference to the preferred embodiment above, it will be understood by those skilled in the art that various additional embodiments may be contemplated without departing from the spirit and scope of the present invention.

INDUSTRIAL APPLICABILITY

Figure 4:
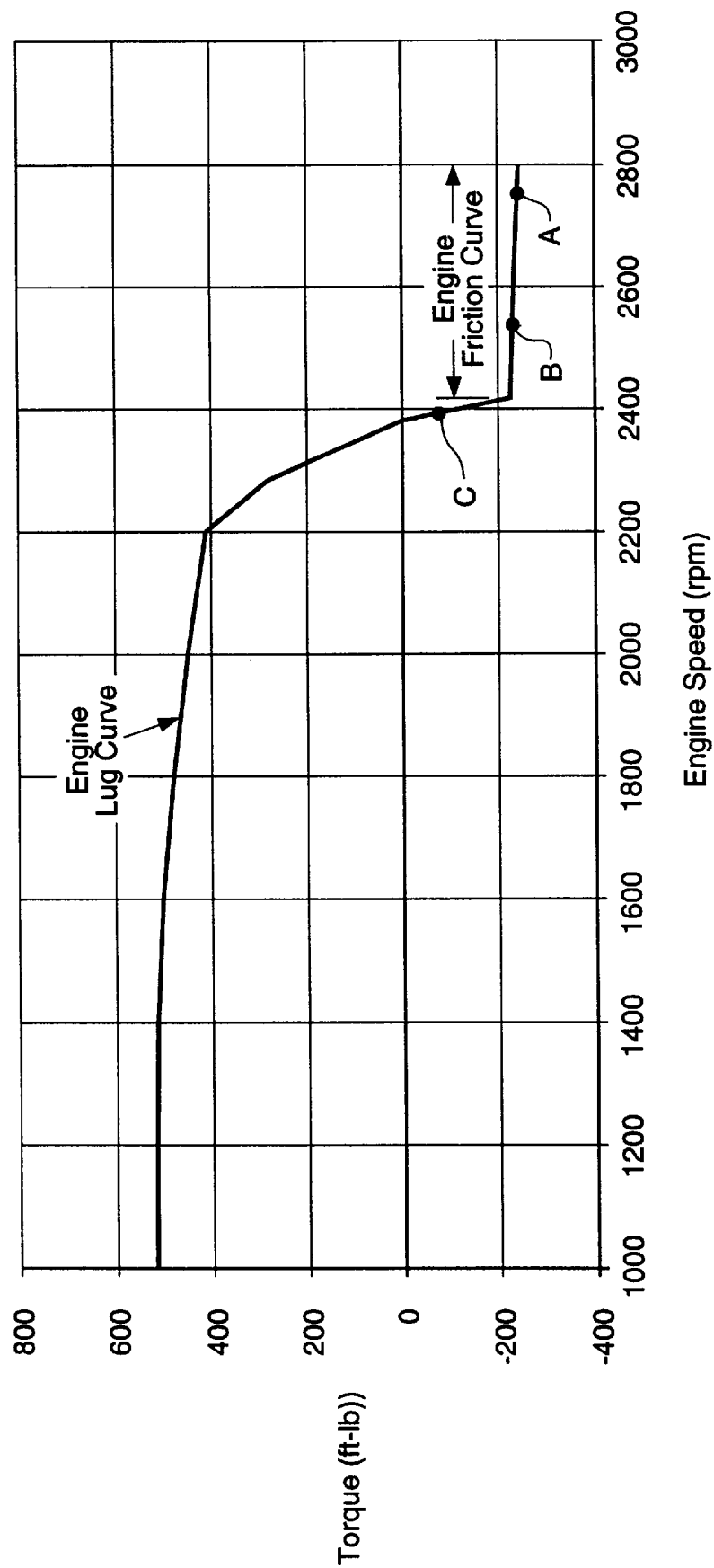
FIG. 4 illustrates a typical engine torque curve and the ideal place of operation of the engine during an overspeed condition.

The present invention determines if the engine is overspeeding, and responsively upstrokes or destrokes the pump 48 and motor 52 to control the machine deceleration rate in order to prevent engine and drivetrain overspeed and to allow the engine speed to settle at an optimum speed to utilize the retarding capability of the engine. This condition can be seen in FIG. 4. An example of an ideal settling speed for the engine is shown at point B. Point B represents the engine operating condition where the engine provides a natural retarding force. Note, at Point C, which represents a common engine operating speed during an overspeed condition provides little natural retarding from the engine. Point A represents a position in which drivetrain overspeed damage occurs.

In response to the engine overspeeding, the controller 18 uses aggressive integral gain values to reduce the negative load on the engine when the machine travel speed is relatively slow, and moderate integral gain values when the machine travel speed is relatively high. Also, the controller 18 uses aggressive integral gain values when the engine speed is less than the natural retarding point of the engine (represented by point B), and moderate integral gain values when the engine speed is between points A & B. When the engine operating speed is greater than the integral threshold, a moderate integral gain is used to slowly adjust the effective deceleration rate which reduces the negative torque on the engine to force the engine speed back to the integral threshold. When the engine speed is lower than the integral threshold, an aggressive integral gain is used to increase the effective deceleration rate to allow the deceleration to more closely follow the desired machine speed by utilizing the retarding characteristics of the engine. The rate at which the negative engine torque is changed, which is a function of the overspeed integral gain, is tuned for stability and responsiveness.

Figure 5:
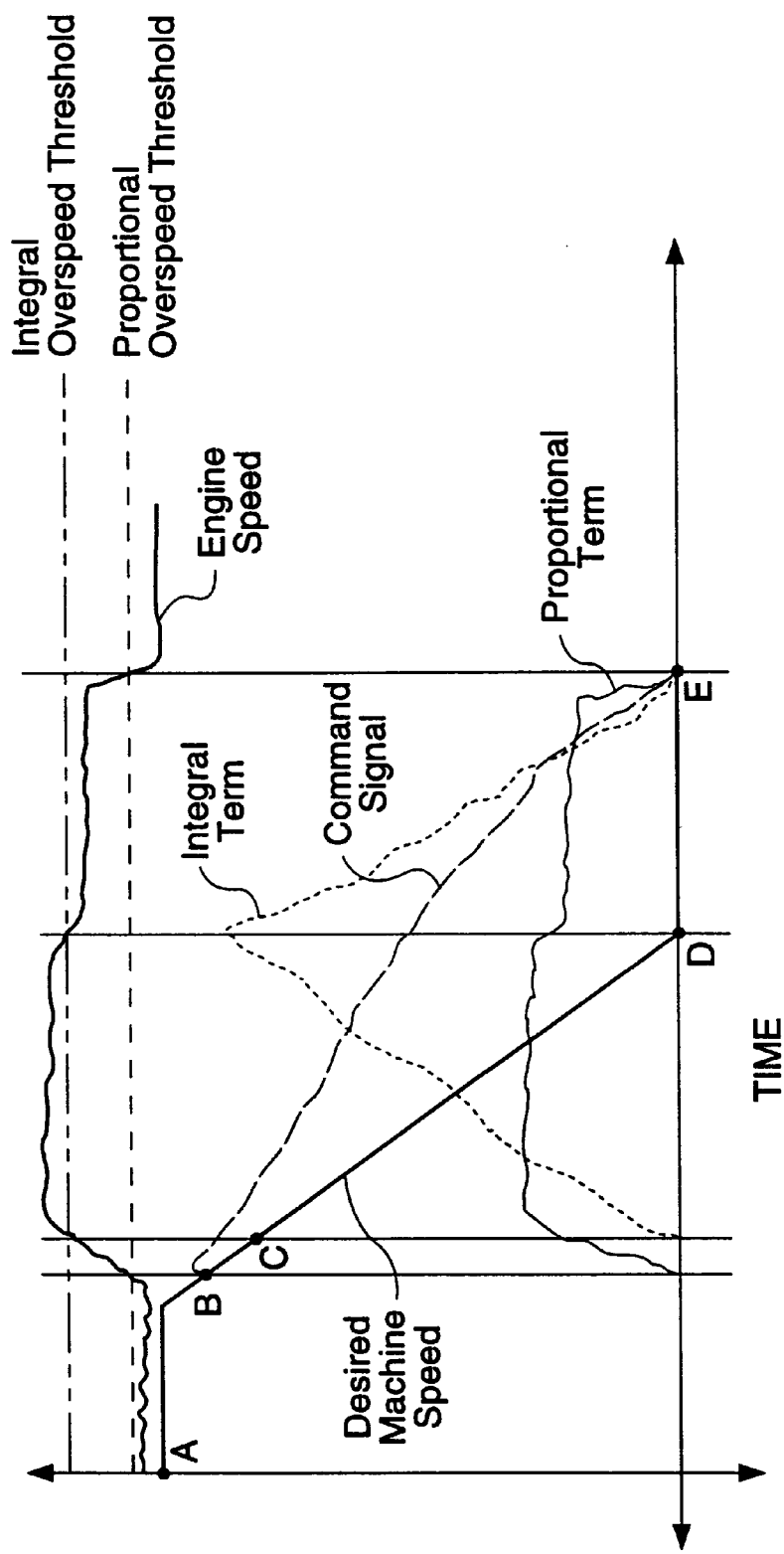
FIG. 5 illustrates an engine speed curve in relation to the operation of the overspeed control.

Reference is now made to FIG. 5 which gives an example of the operation of the overspeed control associated with the present invention in comparison with the desired machine speed, the command signal, actual engine speed, overspeed integral term, and the overspeed proportional term. The described overspeed control operates intermittently and is activated in response to satisfying one of two conditions: (1) the engine overspeeding, e.g., the engine speed being above the proportional overspeed threshold or (2) the integral term of the integral feedback controller being a non-zero value. Referring to the portion of the curve from points A to B on FIG. 5, the overspeed control is shown as being de-activated. However, once the engine speed rises above the proportional overspeed threshold (shown as point B), the engine is said to be overspeeding because of a negative load on the engine and the overspeed control is activated. From points C and D, the integral term "winds up" as the engine speed is above the integral overspeed threshold. From points D and E the overspeed control is "unwinding" in attempt to keep the engine speed near its natural retarding point. Once the machine speed reaches the desired level, then the overspeed control is de-activated as shown at point E.

Advantageously, the overspeed control uses independent thresholds for the proportional and integral terms of the proportional plus integral feedback controller. For example, the proportional term of the overspeed control is activated upon the engine speed rising above the proportional overspeed threshold as seen in FIG. 5, while the integral term is activated upon the engine speed rising above the integral overspeed threshold, where the proportional overspeed threshold is at a lower engine speed than the integral overspeed threshold. The advantage of having independent threshold values is that the proportional term will be applied as soon as the engine overspeeds to help prevent large engine speed overshoot control conditions. However, the integral term attempts to provide a zero steady state error on engine speed. Thus, the integral overspeed threshold can be configured to force the engine to stay near its natural retarding point without damaging any components.

Other aspects, objects and advantages of the present invention can be obtained from a study of the drawings, the disclosure and the appended claims.

What is claimed is:

1. An apparatus for controlling the negative load of an engine associated with a hydro-mechanical drive system, comprising:

a variable displacement pump and motor rotatably driven by the engine;

an engine speed sensor being adapted to sense the rotational speed of the engine and produce an actual engine speed signal indicative of the rotational engine speed;

a travel speed sensor being adapted to sense the travel speed of the machine and produce an actual travel speed signal indicative of the machine travel speed;

an overspeed controller adapted to compare the actual engine speed signal to a proportional and integral threshold, produce a proportional and integral error signal indicative of the difference between the actual engine speed signal magnitude and the corresponding thresholds, produce a proportional and integral control signal in response to the corresponding errors, combine the proportional and integral control signals and responsively produce a command signal; and a displacement controller adapted to receive the command signal and responsively control one of the variable pump and motor displacement to regulate the negative engine load.

2. An apparatus, as set forth in claim 1, wherein the overspeed controller includes a proportional controller for receiving the proportional threshold, comparing the threshold to the actual engine speed, and producing a proportional error signal, and multiplying the proportional error signal by a proportional gain value to produce a proportional control signal.

3. An apparatus, as set forth in claim 2, wherein the overspeed controller includes a integral controller for receiving the integral threshold, comparing the threshold to the actual engine speed, and producing an integral error signal, perform an integral calculation on the integral error, multiplying the integral calculation signal by an integral gain value to produce an integral control signal.

4. An apparatus, as set forth in claim 3, including means for combining the proportional and integral control signals, and multiplying the combination by a gain value to produce an overspeed signal.

5. An apparatus, as set forth in claim 4, including means for combining the overspeed signal with a signal indicative of a desired machine speed to produce the command signal.

6. An apparatus, as set forth in claim 5, including means for utilizing relatively high integral gain values for a relatively slow machine travel speed and relatively low integral gain values for a relatively high machine travel speed.

7. An apparatus, as set forth in claim 6, including means for utilizing high integral gain values for a non-overspeeding condition and low integral gain values for an overspeeding condition.

8. An apparatus, as set forth in claim 1, wherein the proportional controller is activated in response to the engine speed rising above the proportional threshold.

9. An apparatus, as set forth in claim 8, wherein the integral controller is activated in response to the engine speed rising above the integral threshold, the integral threshold representing a higher engine speed than the proportional threshold.

10. An apparatus, as set forth in claim 1, including a continuously variable transmission having a hydro-mechanical transmission.

11. An apparatus, as set forth in claim 1, wherein the electronic controller regulates the displacement of the variable displacement pump and motor to control the machine travel speed to regulate the negative engine load.

12. A method for controlling the negative load of an engine associated with a hydro-mechanical drive system having a variable displacement pump and motor rotatably driven by the engine, comprising the steps of:

producing an actual engine speed signal indicative of the rotational engine speed;

producing an actual travel speed signal indicative of the machine travel speed;

comparing the actual engine speed signal to a proportional and integral threshold, producing a proportional and integral error signal indicative of the difference between the actual engine speed signal magnitude and the corresponding thresholds, calculating a proportional value and integral value based on the corresponding errors, combining the proportional and integral control values and responsively producing a command signal; and receiving the command signal and responsively controlling one of the variable pump and motor to regulate the negative engine load.

13. A method, as set forth in claim 12, including the steps of receiving the proportional threshold, comparing the threshold to the actual engine speed, and producing a proportional error signal, and multiplying the proportional error signal by a proportional gain value to produce a proportional control signal.

14. A method, as set forth in claim 13, including the steps of receiving the integral threshold, comparing the threshold to the actual engine speed, and producing an integral error signal, perform an integral calculation on the integral error, and multiplying the integral calculation signal by an integral gain value to produce an integral control signal.

15. A method, as set forth in claim 14, including the steps of combining the proportional and integral control signals, and multiplying the combination by a gain value to produce an overspeed signal.

16. A method, as set forth in claim 15, including the steps of combining the overspeed signal with a signal indicative of a desired machine speed to produce the command signal.

* * * * *